(12) United States Patent
Weigand et al.

(10) Patent No.: US 9,620,923 B2
(45) Date of Patent: Apr. 11, 2017

(54) DEVICE FOR COUPLING PUMP LIGHT INTO A FIBER AND METHOD FOR PRODUCING A DEVICE OF THIS TYPE

(71) Applicant: ROSENBERGER HOCHFREQUENZTECHNIK GMBH & CO. KG., Fridolfing (DE)

(72) Inventors: Benjamin Weigand, Kaiserslautern (DE); Christian Theobald, Augsburg (DE); Johannes Albert L'huillier, Altleningen (DE); Clemens Wurster, Augsburg (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 0 days.

(21) Appl. No.: 14/914,272

(22) PCT Filed: Aug. 26, 2014

(86) PCT No.: PCT/EP2014/002327
§ 371 (c)(1),
(2) Date: Feb. 25, 2016

(87) PCT Pub. No.: WO2015/028146
PCT Pub. Date: Mar. 5, 2015

(65) Prior Publication Data
US 2016/0218479 A1    Jul. 28, 2016

(30) Foreign Application Priority Data

Aug. 27, 2013    (DE) .................... 10 2013 014 277

(51) Int. Cl.
*H01S 3/30* (2006.01)
*H01S 3/094* (2006.01)
(Continued)

(52) U.S. Cl.
CPC .......... *H01S 3/094019* (2013.01); *G02B 6/34* (2013.01); *H01S 3/094053* (2013.01);
(Continued)

(58) Field of Classification Search
CPC ................................ H01S 3/094; G02B 6/34
(Continued)

(56) References Cited

U.S. PATENT DOCUMENTS

| 4,815,079 A | 3/1989 | Snitzer |
| 6,373,868 B1 | 4/2002 | Zhang |

(Continued)

FOREIGN PATENT DOCUMENTS

| DE | 102010004852 | * 7/2011 | ............. H01S 3/042 |
| DE | 102011103286 A1 | 12/2012 | |
| EP | 1873874 A2 | 1/2008 | |

*Primary Examiner* — Tuan Nguyen
(74) *Attorney, Agent, or Firm* — DeLio, Peterson & Curcio, LLC; Robert Curcio

(57) ABSTRACT

A device for laterally coupling pump light into a fiber. A fiber runs in a longitudinal direction, having an optically active medium to be pumped and a lateral wall running approximately in the longitudinal direction, and at least one light coupler, at least some part of which runs parallel to the fiber along the lateral wall. The light coupler is an optical waveguide which is optically coupled to the fiber such that pump light propagating in the optical waveguide can be coupled into the fiber via the lateral wall. The efficiency of the pump light coupling is improved by a plurality of windings of the fiber being located alternately with waveguides on a substrate. The pump light can be coupled into all waveguides simultaneously, for example by a prism.

21 Claims, 3 Drawing Sheets

(51) Int. Cl.
*G02B 6/34* (2006.01)
*H01S 3/067* (2006.01)
*G02B 6/26* (2006.01)

(52) U.S. Cl.
CPC .......... *G02B 6/262* (2013.01); *H01S 3/06704* (2013.01); *H01S 3/094049* (2013.01)

(58) Field of Classification Search
USPC ...................................... 359/341.3; 385/126
See application file for complete search history.

(56) References Cited

U.S. PATENT DOCUMENTS

| | | |
|---|---|---|
| 6,477,295 B1 | 11/2002 | Lang |
| 6,493,492 B1 | 12/2002 | Fischer |
| 6,683,892 B1* | 1/2004 | Yamaura ............. H01S 3/06704 359/341.1 |
| 6,700,697 B2 | 3/2004 | Nikolajsen |
| 2003/0112497 A1* | 6/2003 | Alduino ................ H01S 3/0632 359/341.3 |
| 2007/0076770 A1 | 4/2007 | Galun |
| 2008/0267228 A1 | 10/2008 | Sacks |
| 2009/0296745 A1 | 12/2009 | Morse et al. |
| 2012/0051686 A1 | 3/2012 | Pitwon |

* cited by examiner

DEVICE FOR COUPLING PUMP LIGHT INTO A FIBER AND METHOD FOR PRODUCING A DEVICE OF THIS TYPE

BACKGROUND OF THE INVENTION

1. Field of the Invention

The invention relates to a device for laterally coupling pump light into a fiber. The device comprises the fiber which runs in a longitudinal direction and which has an optically active medium to be pumped, with a lateral wall running approximately in the longitudinal direction, and at least one light coupling means, at least some part of which runs parallel to the fiber along the lateral wall.

2. Description of Related Art

Usually, fiber lasers or fiber amplifiers are optically pumped in that pump light is radiated into the fiber via a facet of the optically active fiber. For this purpose, the pump light must be so directed or focussed onto the facet of the fiber that it enters into the pump core (inner cladding) of the fiber and creates a population inversion in the optically active signal core of the fiber which is surrounded by the pump core (inner cladding). However, a coupling-in of pump light via a facet of the fiber can be difficult due to the small cross-sectional area of the pump core, which requires a precise adjustment of the pump beam. Furthermore, high field strengths can occur in the coupling area which can damage the fiber. A coupling-in via a facet of the fiber can also be problematic since the pump light must be suitably superposed, for which purpose various precautions such as the superposition of different beam polarisations or wavelengths can be necessary. Also, a highly inhomogeneous distribution of pump light within the fiber can result through coupling via the facet.

Optical fibers usually have a round cross-section. However, there are also fibers with at least one flat lateral wall and fiber with a "flat", for example with octagonal cross-section or similar. A fiber in the sense of the present disclosure includes fibers with different cross-sectional forms.

Due to these problems, the lateral coupling of pump light into the fiber has already been suggested. In the publication DE 10 2011 103 286, the transverse coupling of pump light into the fiber is described, wherein the pump beam strikes the fiber perpendicularly through refocusing in an elliptical pump chamber. This represents the state of the art for flashbulb-pumped solid state lasers. However, in this case the coupling efficiency is often unsatisfactory.

According to the publication U.S. Pat. No. 6,477,295 light is coupled transversely into a fiber in that pump light is first radiated into a glass cladding surrounding the stripped fiber, the refractive index of which is matched to the refractive index of the fiber cladding (see FIGS. 8 and 10). Due to the large surface of the glass cladding, high field strengths at the boundary surface between glass and air such as can occur with the coupling-in of pump light via the fiber facet are avoided and the destruction threshold of the pump arrangement is increased. On the other hand, this method of coupling leads to an inhomogeneous pump light distribution within the pump core of the optical fiber. The same applies to coupling-in at a bend in the fiber (see FIG. 6).

SUMMARY OF THE INVENTION

In view of the problems described, it is the object of the present invention to increase coupling efficiency in the transverse coupling of pump light into an optically active fiber and to avoid pump light losses.

This problem is solved through a further development of known pump modules which is substantially characterized in that the light coupling means is an optical waveguide which is optically coupled to the fiber such that pump light propagating in the optical waveguide can be coupled into the fiber via the lateral wall, in particular by means of mode crosstalk, and/or by the overlap of evanescent fields.

This causes an even activation of the optically active medium and the laser-active substances over the length of the relevant activation section and leads to an increased efficiency of the radiated pump light.

In other words, the light coupling means running along the lateral wall of the fiber and parallel to this, as well as the fiber itself, is a waveguide which is configured for the propagation of light modes in the longitudinal direction of the fiber. The transition between the fiber and the light coupling means is realized according to the invention such that pump light propagating in the light coupling means enters the fiber through mode crosstalk or through the overlap of evanescent fields and leads to a population inversion in the signal core of the fiber. In this way, photons are removed from the modes propagating in the waveguide and used to excite the optically active medium in the fiber core.

The above and other objects, which will be apparent to those skilled in the art, are achieved in the present invention which is directed to a device for laterally coupling pump light into a fiber comprising the fiber which runs in a longitudinal direction (L) and which has an optically active medium to be pumped, with a lateral wall running approximately in the longitudinal direction (L) and with at least one light coupler, at least some part of which runs parallel to the fiber along the lateral wall, wherein the light coupler is an optical waveguide which is optically coupled to the fiber such that pump light propagating in the optical waveguide can be coupled into the fiber via the lateral wall, in particular by a mode crosstalk, or by overlap of evanescent fields, wherein the fiber has two or more pump sections, each running in the longitudinal direction (L) and arranged next to one another, between which an optical waveguide is in each case arranged, such that the optical waveguides are formed in a plate-formed wafer, wherein the device includes a coupling part with a flat contact surface for coupling pump light into the optical waveguide which lies against a flat lateral surface of the optical waveguide.

The optical waveguide is a waveguide with at least one flat outer boundary surface such as a ridge waveguide or an optical fiber with flat.

The lateral wall of the fiber lies in contact with an outer boundary surface of the optical waveguide and/or an intermediate space between the lateral wall of the fiber and an outer boundary surface of the optical waveguide facing the lateral wall is filled with a refractive-index-matched translucent medium such as a polymer-containing medium.

In order to increase the efficiency of coupling, an outer boundary surface of the optical waveguide facing the lateral wall of the fiber is structured, displaying an amplitude modulation.

The device further includes a refractive index modulation in the fiber and/or in the optical waveguide in order to increase the efficiency of coupling into the fiber.

Two optical waveguides may be arranged on opposite sides of the fiber, in the form of ridge waveguides.

The pump sections of the fiber and the optical waveguides alternate periodically in a direction (Q) transverse, in particular roughly perpendicular, to the longitudinal direction.

The fiber may be arranged in windings, wherein each winding contains a pump section.

The fiber may include a core with the optically active medium and a cladding surrounding the core with the lateral wall, the refractive index of which is matched to the refractive index of the optical waveguide.

The coupling part is a coupling prism. The coupling part covers two or more optical waveguides arranged next to one another in a transverse direction.

Two or more optical waveguides may fixed next to one another on a common substrate, wherein the transition between the optical waveguides and the substrate is configured such that total reflection occurs within the interior of the optical waveguide at the transition.

In a second aspect, the present invention is directed to a method for manufacturing a device for laterally coupling pump light into a fiber comprising the fiber which runs in a longitudinal direction (L) and which has an optically active medium to be pumped, with a lateral wall running approximately in the longitudinal direction (L) and with at least one light coupler, at least some part of which runs parallel to the fiber along the lateral wall, wherein the light coupler is an optical waveguide which is optically coupled to the fiber such that pump light propagating in the optical waveguide can be coupled into the fiber via the lateral wall, in particular by a mode crosstalk, or by overlap of evanescent fields, wherein the fiber has two or more pump sections, each running in the longitudinal direction (L) and arranged next to one another, between which an optical waveguide is in each case arranged, such that the optical waveguides are formed in a plate-formed wafer, wherein the device includes a coupling part with a flat contact surface for coupling pump light into the optical waveguide which lies against a flat lateral surface of the optical waveguide, said method including optical waveguides running next to one another in a plate-formed wafer, and in which a fiber with an optically active core is then laid, in a form-locking manner, in the spaces formed between the optical waveguides, and a coupling part with a flat contact surface for coupling pump light into the optical waveguide is laid against a flat lateral surface of the at least one optical waveguide.

The optical waveguides are created in the wafer through laser ablation, etching and/or mechanical machining processes such as milling or sawing.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED
EMBODIMENT(S)

Figure 2:
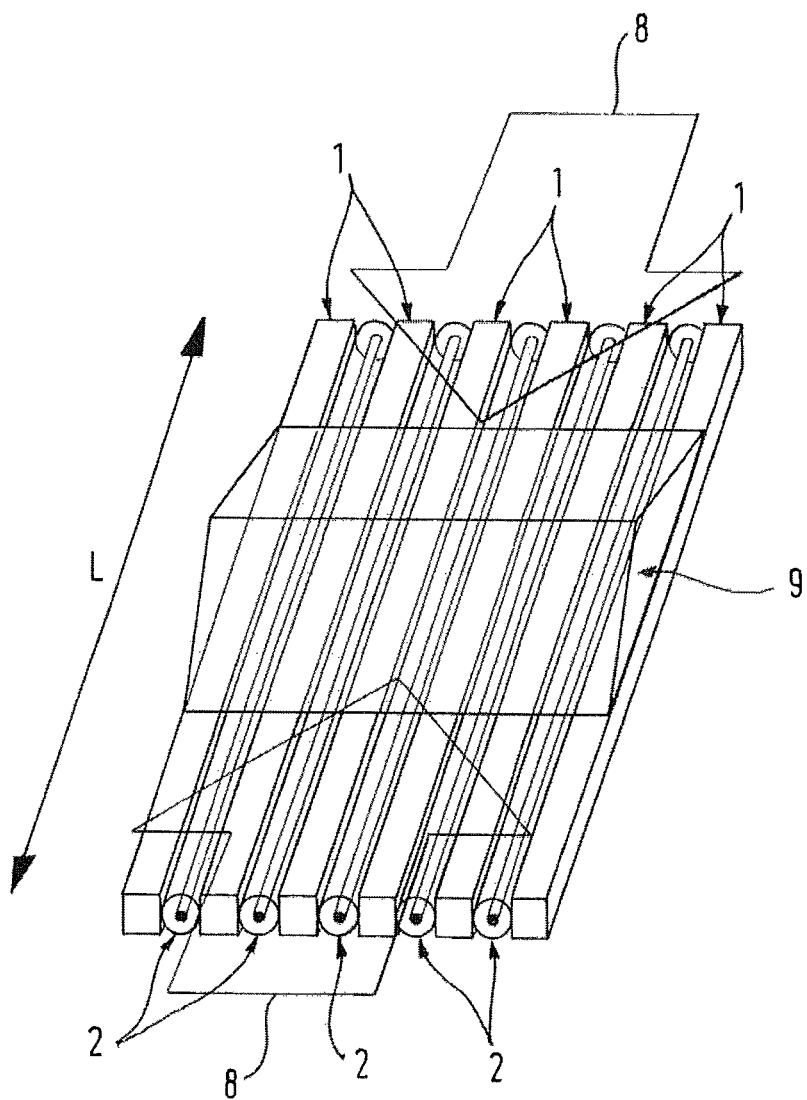
FIG. 2 shows a perspective view of the device from FIG. 1 in a diagrammatic representation, wherein pump light is coupled into the optical waveguides of the device via a coupling prism.
Figure 3:
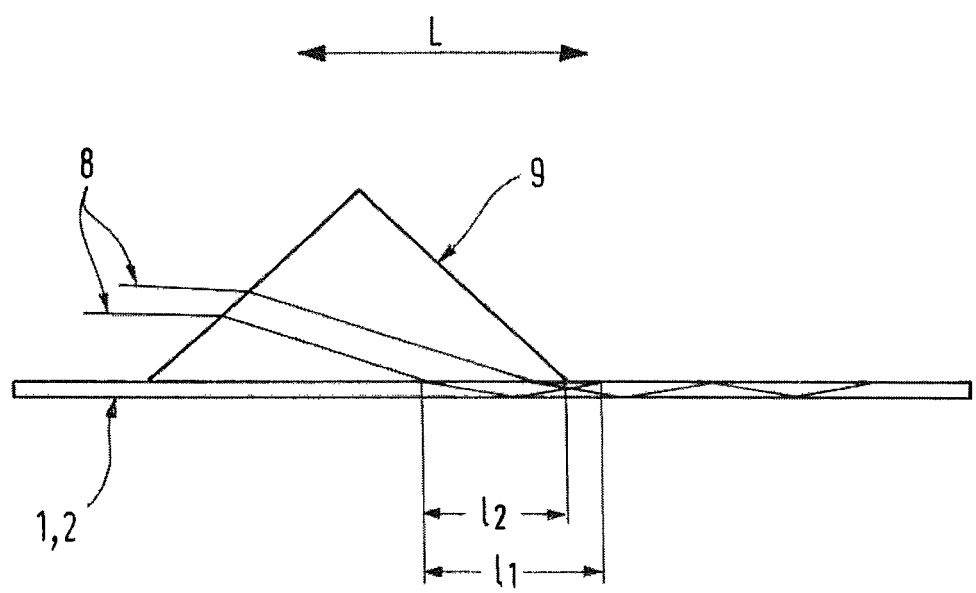
FIG. 3 shows a cross-sectional view of the device from FIG. 1, wherein the longitudinal axis of the fiber runs in the sectional plane.

In describing the preferred embodiment of the present invention, reference will be made herein to FIGS. 1-3 of the drawings in which like numerals refer to like features of the invention.

The invention is based on the finding that pump light losses can be avoided in that the light coupling means is itself a waveguide in which the pump light can propagate practically free of losses due to the total reflection on the boundary surfaces, while an efficient coupling-in of pump light via the lateral wall of the fiber which is optically coupled to the light coupling means is possible. On the other hand, the light coupling means can be configured such that it can effectively absorb the pump radiation from a pump laser or another light source, whereby the pump radiation can then be coupled into the fiber practically free of losses.

Due to the optical coupling of the waveguide to the lateral wall of the fiber, the mode structure supported by the waveguide can be altered, or have an intensity profile displaced in cross section in the direction of the fiber, in such a way that leaky modes and/or radiation modes of the waveguide couple into the fiber particularly efficiently. Alternatively, or additionally, the waveguide can be so designed and coupled to the lateral wall of the fiber that the propagation of supermodes propagating simultaneously in the fiber and waveguide is possible. Photons are removed from these supermodes during their propagation in the longitudinal direction through the creation of a population inversion in the signal core and fed to the laser mode in the signal core.

The "optical coupling" of the waveguide to the lateral wall does not necessarily mean a physical contact between the waveguide and the lateral wall of the fiber. Rather, a coupling-in of pump light is also possible with a (small) intermediate space, for example through evanescent fields. Preferably however, the lateral wall and the outer boundary surface of the waveguide are, at least in sections, in direct contact. The waveguide can be so matched to the fiber in its design, its dimensions, material properties, surface structure etc. that a particularly efficient crosstalk of modes propagating in the waveguide into the fiber takes place.

The waveguide preferably extends alongside the fiber over a longer distance in the longitudinal direction, wherein the dimension of this linear distance is adjusted such that practically all of the pump light propagating in the waveguide is transformed into laser light in the signal core of the fiber. The dimension of the waveguide in the longitudinal direction is preferably more than 5 times as great as the diameter of the fiber, particularly preferably more than 10 times as great, in particular 20 times as great or more.

In a particularly preferred embodiment, the optical waveguide is a waveguide with at least one flat outer boundary surface, for example a ridge waveguide or an optical fiber with flat. Alternatively, the optical waveguide can also be an optical fiber with round or elliptical cross-section. In the case of a flat outer boundary surface of the waveguide, the pump light from the pump light source can be coupled into the waveguide particularly efficiently via this flat surface and coupled further into the fiber via a further outer boundary surface facing the lateral wall of the fiber. This outer boundary surface can also be flat in order to increase the efficiency of coupling into the fiber.

A ridge waveguide is economical to manufacture and, due to the mode structure which forms therein, is particularly suitable as a means of coupling light into a fiber, in particular into a fiber with at least one flat lateral wall such as a fiber with a flat.

Preferably, the diameter of the waveguide substantially corresponds to the diameter of the fiber. Particularly preferably, the diameter of the fiber and of the waveguide is greater than 200 µm and less than 1000 µm, in particular greater than 300 µm and less than as 500 µm, for example around 400 µm. The signal core of the fiber can have a diameter of between 10 µm and 100 µm, in particular around 50 µm. Alternatively, the fiber can be a fiber with a particularly large core diameter, for example a core diameter of more than 100 µm and less than 300 µm, in particular around 150 µm. Single-mode fibers with a particularly small core diameter are also conceivable (for example core diameter<10 µm).

The lateral wall of the fiber can be in contact with an outer boundary surface of the optical waveguide. This leads to a particularly pronounced mode crosstalk. Alternatively, or additionally, an intermediate space between the lateral wall of the fiber and an outer boundary surface of the optical waveguide facing the lateral wall can be filled with a preferably refractive-index-matched, translucent medium such as a SmartGel® (or with another translucent polymer-containing medium). This can further increase the efficiency of coupling into the fiber.

In a particularly preferred embodiment, the lateral wall of the fiber is in contact with the outer boundary surface of the waveguide, whereby spaces remaining between the lateral wall and the outer boundary surface due to an outer curvature of the fiber are filled with a refractive-index-matched medium. The medium can be introduced into the intermediate space in gel-like form and subsequently hardened. A good mode crosstalk between waveguide and fiber is achieved if the medium has roughly the same refractive index as the fiber cladding and/or the waveguide.

The lateral wall of the optical fiber via which the pump light is coupled can be flat. In other words, the optical fiber can have at least one flat.

The efficiency of coupling into the fiber can be further improved if an outer boundary surface of the optical waveguide facing the lateral wall of the fiber is structured. In particular, an amplitude modulation can be inscribed into the outer boundary surface of the waveguide which can have a wave-like, jagged or sawtooth cross-sectional profile in the manner of a "blazed grating". The modulation can be inscribed into the wall of the optical waveguide during manufacture of the optical waveguide through laser ablation or during manufacture of the optical waveguide through the sol-gel process through a specific pattern of moulding. The periodicity of the modulation can be adjusted to the wavelength of the pump light.

The fiber and/or the optical waveguide can also display a refractive index modulation, through which the efficiency of coupling into the fiber is increased (creation of volume Bragg gratings or tilted Fiber Bragg Gratings). The refractive index modulation can be inscribed by means of UV radiation in a manner known to the skilled person.

In terms of achieving a high pump radiation density while avoiding the formation of so-called hot-spots, it has proved practical to arrange two optical waveguides on opposite sides of the fiber. In a particularly preferred embodiment, the fiber is arranged between two roughly parallel ridge waveguides. Pump light propagating in the two ridge waveguides can then be coupled into the fiber via the lateral wall on opposite sides of the fiber.

In terms of achieving a compact design of the device while simultaneously increasing the laser power achieved in the core, it has proved practical to provide two or more pump sections of the fiber, each running in the longitudinal direction and arranged next to one another, between which a waveguide is in each case arranged. For this purpose, the fiber can be arranged in windings, wherein each winding has one or more pump sections arranged behind one another. Preferably, in order to increase the laser power achieved in the core, the fiber has more than two, particularly preferably more than ten windings with one or more pump sections in each case. The arrangement of the optical waveguides between the individual pump sections of the fiber makes possible an efficient coupling of pump light into the fiber. For this purpose, the pump sections of the fiber and the optical waveguides can alternate in a direction transverse to, in particular roughly perpendicular to the longitudinal direction. In other words, an arrangement of parallel optical waveguides and fiber sections is formed which alternate periodically in the transverse direction, so that overall a compact pump module is created which makes possible the spatially concentrated coupling-in of pump light from a pump light source. In particular, a single pump light bundle with correspondingly dimensioned bundle diameter can strike several waveguides arranged next to one another, so that the individual windings of the fiber are pumped simultaneously. This simplifies an adjustment of the overall optical system.

The fiber can have a core with the optically active medium and an (inner) cladding surrounding the core with the lateral wall as outer boundary, wherein the refractive index of the cladding can be matched to the refractive index of the optical waveguide. The core of the fiber can consist of a preferably rare-earth-doped (for example with ytterbium or erbium) quartz glass. The cladding of the fiber can be surrounded, before and/or after the pump sections of the fiber, by one or more protective layers of plastic ("coating" or "buffer"), which can also regularly be surrounded by a protective jacket. If the core is surrounded by several claddings (for example an inner and an outer cladding), as a rule the refractive indices of the individual light-carrying parts (core, inner cladding, outer cladding etc.) decrease from the inside outwards, so that the modes propagating in the inner light-carrying part in each case propagate in the longitudinal direction without losses as a result of total reflection. As a result of the matching of the refractive indices of the cladding material of the fiber and the waveguide material, the crosstalk of the pump light fields between fiber and waveguide is amplified. For example, both the fiber cladding and the waveguide can consist of quartz glass (n=1.45).

In order to couple pump light into the optical waveguide, a coupling part is provided which is optically coupled to a lateral surface of the optical waveguide, in particular being in contact with the lateral surface and/or connected thereto. Advantageously, in order to increase the amount of light coupled in, both the lateral surface of the optical waveguide and the contact surface of the coupling part are flat. The material of the coupling part can have a higher refractive index than the material of the optical waveguide. The dimension of the coupling part in the longitudinal direction is so dimensioned that light already coupled into the waveguide does not strike the boundary surface between the coupling part and the optical waveguide but, due to total reflection, is reflected back into the waveguide.

A prism has proved to be a particularly suitable coupling part, since economical free-beam laser diodes can be used as pump light sources, and light can be coupled into the optical waveguide and the fiber over the entire width of the prism. The angle of divergence and the angle of incidence of the pump light bundle striking the prism and the prism angle are so configured that as far as possible all the pump beams striking the boundary surface between prism and waveguide within the prism are coupled into the waveguide, but during the course of their propagation within the interior of the waveguide do not strike the boundary surface between prism and waveguide a second time. In this way a reflection of pump radiation from the waveguide back into the prism and thus pump light losses are avoided.

The coupling part can cover two or more optical waveguides arranged next to one another in a transverse direction. A single pump light bundle striking the coupling part can thus be coupled into several optical waveguides, as a result of which adjustment of the overall arrangement is simplified and a compact device is created.

In order to allow simple adjustment and maintain a mechanically stable overall device, it has proved practical for two or more optical waveguides to be fixed next to one another on a common substrate, wherein the transition between the optical waveguide and the substrate is configured such that total reflection within the interior of the optical waveguide occurs at the transition.

If the device according to the invention is the pump module of a fiber laser, the resonator can be bounded by Fiber Bragg Gratings (FBG) inscribed in the fiber. Further amplifier stages can be connected in a cascading manner behind the output coupler. If one of the amplifier stages is a fiber amplifier, a further device according to the invention can also be used as the pump module of the fiber amplifier.

Cooling plates can be arranged on an upper side and/or on an underside of the device according to the invention in order to allow the efficient dissipation of heat. This minimises thermal loads. The cooling plates can be manufactured of metal. Alternatively or additionally, the substrate can be designed as a cooling plate or can include a cooling plate. The cooling plates can be connected to a heat sink, which can be air-cooled or liquid-cooled.

The invention further comprises a method for manufacturing a device according to the invention, in which optical waveguides running next to one another are formed in a plate-formed wafer and then a fiber with an optically active medium as core material is laid, in a form-locking manner, in the intermediate space formed between the optical waveguides. Preferably, several windings of the fiber are laid in the spaces between several optical waveguides created next to one another. The manufacture of the optical waveguides, preferably in the form of ridge waveguides, can take place through laser ablation, through mechanical erosive processes such as sawing or milling, through etching processes and/or through sol-gel processes.

The wafer can be multilayered and can have a first layer consisting of an optically transparent material (preferably quartz glass) in which the optical waveguides are created, and a second layer for stabilisation, for example a silicon layer. An intermediate layer can be arranged between these two layers which has a lower refractive index than the optically transparent material, in order to make possible a total reflection at the boundary surface between the optically transparent material and the intermediate layer.

The multilayered wafer can be manufactured by layering a first wafer of the optically transparent material with a coating material/varnish material such as polydimethylsiloxane (PDMS, n=1.43), the refractive index of which is lower than the refractive index of the transparent material, and then laying a second wafer for the purpose of mechanical stabilisation. The two wafers are bonded together through subsequent baking.

Alternatively, the second layer can have a lower refractive index than the first layer and can simultaneously stabilise the first layer. For example, fluorine-doped quartz glass or similar can be used as the second layer, which can be bonded with the first layer through optical contact bonding, fusing or other joining methods. This improves the temperature resistance of the device according to the invention which is to be manufactured.

Before laying the fiber in the spaces between the optical waveguides, the spaces can be filled with a refractive-index-matched medium such as a SmartGel®. The medium is introduced into the spaces in gel-like form and the fiber is then laid in the spaces in a form-locking manner, with partial displacement of the medium, whereupon the medium is preferably hardened.

Alternatively, the waveguides running next to one another can be manufactured by means of a sol-gel. A sol fluid which contains highly pure $SiO_2$ particles in a specified concentration is poured into a mould, where it gels within a certain time. The resulting wet gel part is removed from the mould and dried. In a final thermal step, the gel part shrinks and thereby assumes exactly the required dimensions. The mould is so designed that a transparent quartz glass part is produced which contains the waveguides running next to one another.

Figure 1:
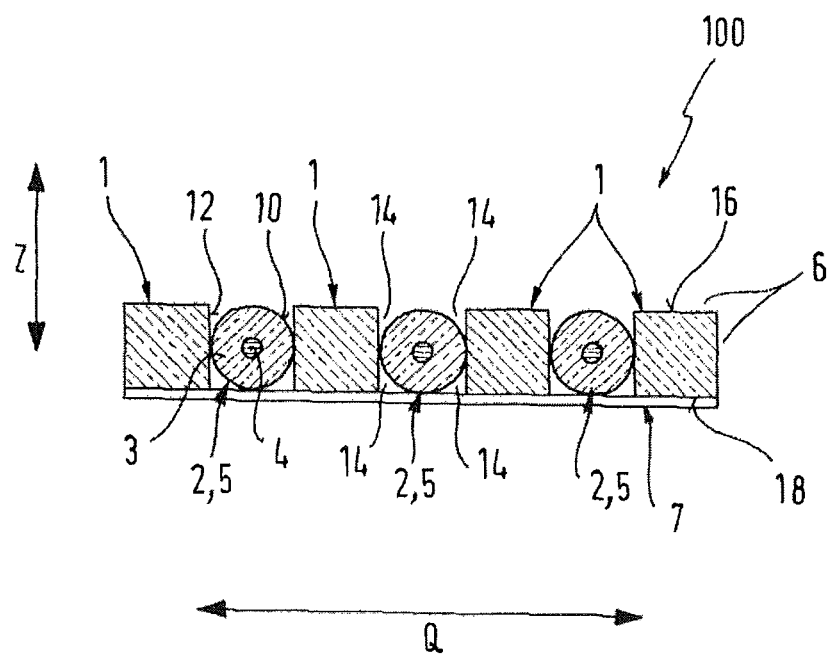
FIG. 1 shows a cross-sectional view of a device according to the invention, wherein the sectional plane runs perpendicular to the longitudinal axis of the fiber.

FIG. 1 shows a device 100 according to the invention for coupling pump light into a fiber 2 in a cross-sectional view roughly perpendicular to the longitudinal direction L of the fiber 2. The fiber has a core 4 with an optically active material such as a rare-earth-doped quartz glass and an (inner) cladding 3 ("cladding") surrounding the core 4. The device according to the invention can be a part of a fiber laser or of a fiber amplifier. The laser resonator of the fiber laser can, in a known manner, be bounded by Fiber Bragg Gratings. Details of the structure of a fiber laser are described in the relevant technical literature.

The fiber 2 is arranged in several windings 5, wherein each winding 5 has at least one pump section in which pump light 8 is coupled into the fiber from the side (transversely). The cross-sectional view in FIG. 1 runs through these pump sections of the fiber.

The coupling-in of the pump light 8 takes place via waveguides 1 running next to and parallel to the pump sections of the fiber 2. The longitudinal direction L of the waveguides and thus the direction of propagation of the pump light propagating in the waveguides 1 thus substantially corresponds to the longitudinal direction L of the fiber 2 and thus the direction of propagation of the laser radiation to be generated in the core 4. The waveguides 1 are coupled optically to a lateral wall 10 of the fiber in such a way that a mode crosstalk of the pump light 8 propagating in the waveguides takes place in the fiber. In particular, the crosstalk of the pump light into the fiber cladding 3 via the lateral wall 10 can take place through radiation modes, leaky modes and/or supermodes which are supported by the waveguide-fiber arrangement. Evanescent light fields can also couple over from the waveguides 1 into the fiber cladding 3. The pump radiation couples back and forth between the waveguides 1 and the pump sections of the fiber 2, as a result of which several pump sections are always pumped simultaneously.

The spatial confinement of the pump radiation within the overall structure consisting of fiber 2 and waveguides 1 takes place in both the transverse direction Q and in the vertical direction Z through total reflection at the boundary surface between the waveguides or the fiber and the surrounding medium 6 or through total reflection at the boundary surface between the waveguides or the fiber and a substrate 7, to which the waveguides 1 running next to one another are fixed.

The cladding material of the fiber 2 and the waveguide material have substantially the same refractive indices. Both the cladding and the waveguides can for example be formed of quartz glass (or $SiO_2$, n=1.45).

As shown in FIG. 1, the device according to the invention has numerous waveguides 1 running next to one another, between each of which a fiber winding 5 is laid in a form-locking manner such that the fiber wall 10 lies in contact with an outer boundary surface 12 of the waveguide 1. A periodic arrangement is thus formed in which the waveguides and the pump sections of the fiber 2 alternate in the transverse direction Q.

The waveguides 1 are dielectric ridge waveguides with roughly square cross-section. Alternatively, other cross-sectional forms are equally conceivable. However, ridge waveguides have the advantage of simplicity of manufacture, have a flat top surface 16 which is particularly suitable for coupling pump light from a pump light source (for example a diode laser), and have a flat base surface 18, which is particularly suitable for fixing to the common substrate 7.

The feeding of the pump light 8 into the waveguides 1 is now described with reference to the FIGS. 2 and 3.

A prism 9 with a flat base surface is brought into optical contact with the flat top surfaces 16 of several waveguides 1 running next to one another. The use of the prisms 9 allows economical free-beam laser diodes to be used, since light is coupled into the waveguides 1 and into the fiber windings 5 over the entire width of the prism 9. The refractive index of the prism material (for example N-BK7, n=1.51) is preferably higher than the refractive index of the waveguide material.

Pump radiation is radiated into the prism via at least one lateral surface of the prism 9 and refracted in the direction of the top surface 16 of the waveguides. The pump radiation then enters the waveguides 1 from the side. The dimension of the prism in the longitudinal direction L is so configured that pump radiation introduced into the waveguides following total reflection on the lower boundary surface 18 of the waveguide does not pass back again into the prism 9 at the upper boundary surface of the waveguide (see FIG. 3).

A method for manufacturing the device 100 according to the invention is described in the following:

A quartz glass wafer is coated on one side with PDMS (or another suitable coating) and laid with this side on a silicon wafer which is intended to mechanically stabilise the structure. Both wafers are baked together. The PDMS solidifies and bonds the two wafers together. The height of the quartz glass wafer is polished to the diameter of the fiber cladding 3. Parallel ridge waveguides are created in the quartz glass wafer through high-precision laser ablation. A specific amplitude modulation of the lateral outer boundary surfaces 12 of the ridge waveguides 1 can be achieved through adjustment of the pulse overlap of the laser radiation which is used to create the ridge waveguides. The fiber 2 is laid in several windings 5, in a form-locking manner, in the spaces between the ridge waveguides. The outermost boundary layers of the overall structure are polished in optical quality.

The prism 9 is applied to a region of the periodic structure with laid-in fiber 2 extending over several ridge waveguides in the transverse direction Q for the purpose of coupling in pump radiation.

Alternatively, the ridge waveguides and/or the prism 9 can be manufactured by means of the sol-gel method. In this case the amplitude modulation of the lateral outer boundary surfaces 12 of the ridge waveguides can be achieved through a specific pattern of moulding.

The modulation of the refractive index of the lateral walls can be induced through laser radiation.

The invention is not limited to the embodiment shown in the figures. For example, instead of the ridge waveguides shown, other types of waveguides can be used such as fibers or slab waveguides, in which the propagation of the pump light is only limited in one dimension (namely in the vertical direction Z perpendicular to the longitudinal direction L and perpendicular to the transverse direction Q). For example, several pump sections of the fiber running next to one another can be embedded in such a slab waveguide. In this case the device can for example be manufactured by means of the sol-gel method by embedding the fiber in a gel-like, dielectric, flat medium and subsequently hardening this. Further embodiments are conceivable.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A device for laterally coupling pump light into a fiber comprising the fiber which runs in a longitudinal direction (L) and which has an optically active medium to be pumped, with a lateral wall running approximately in the longitudinal direction (L) and with at least one light coupler, at least some part of which runs parallel to the fiber along the lateral wall, wherein the light coupler is an optical waveguide which is optically coupled to the fiber such that pump light propagating in the optical waveguide can be coupled into the fiber via the lateral wall, in particular by a mode crosstalk, or by overlap of evanescent fields, wherein the fiber has two or more pump sections, each running in the longitudinal direction (L) and arranged next to one another, between which an optical waveguide is in each case arranged, such that the optical waveguides are provided in an optically transparent layer of a multi-layered wafer, wherein the device includes a coupling part with a flat contact surface for coupling pump light into the optical waveguide which lies against a flat lateral surface of the optical waveguide.

2. The device of claim 1, wherein the optical waveguide is a waveguide with at least one flat outer boundary surface such as a ridge waveguide or an optical fiber with flat.

3. The device of claim 2, wherein the lateral wall of the fiber lies in contact with an outer boundary surface of the optical waveguide and/or an intermediate space between the lateral wall of the fiber and an outer boundary surface of the optical waveguide facing the lateral wall is filled with a refractive-index-matched translucent medium such as SmartGel®.

4. The device of claim 3, wherein in order to increase the efficiency of coupling, an outer boundary surface of the optical waveguide facing the lateral wall of the fiber is structured, displaying an amplitude modulation.

5. The device of claim 4, including a refractive index modulation in the fiber and/or in the optical waveguide in order to increase the efficiency of coupling into the fiber.

6. The device of claim 4, including two optical waveguides arranged on opposite sides of the fiber, in the form of ridge waveguides.

7. The device of claim 6 wherein the pump sections of the fiber and the optical waveguides alternate periodically in a direction (Q) transverse, in particular roughly perpendicular, to the longitudinal direction.

8. The device of claim 1, wherein the lateral wall of the fiber lies in contact with an outer boundary surface of the optical waveguide and/or an intermediate space between the lateral wall of the fiber and an outer boundary surface of the optical waveguide facing the lateral wall is filled with a refractive-index-matched translucent medium such as a polymer-containing medium.

9. The device of claim 1, wherein in order to increase the efficiency of coupling, an outer boundary surface of the optical waveguide facing the lateral wall of the fiber is structured, displaying an amplitude modulation.

10. The device of claim 1, including a refractive index modulation in the fiber and/or in the optical waveguide in order to increase the efficiency of coupling into the fiber.

11. The device of claim 1, including two optical waveguides arranged on opposite sides of the fiber, in the form of ridge waveguides.

12. The device of claim 1 wherein the pump sections of the fiber and the optical waveguides alternate periodically in a direction (Q) transverse, in particular roughly perpendicular, to the longitudinal direction.

13. The device of claim 1 wherein the fiber is arranged in windings, wherein each winding contains a pump section.

14. The device of claim 1 wherein the fiber includes a core with the optically active medium and a cladding surrounding the core with the lateral wall, the refractive index of which is matched to the refractive index of the optical waveguide.

15. The device of claim 1 wherein the coupling part is a coupling prism.

16. The device of claim 15, wherein the coupling part covers two or more optical waveguides arranged next to one another in a transverse direction.

17. The device of claim 1, wherein the coupling part covers two or more optical waveguides arranged next to one another in a transverse direction.

18. The device of claim 1, wherein two or more optical waveguides are fixed next to one another on a common substrate, wherein the transition between the optical waveguides and the substrate is configured such that total reflection occurs within the interior of the optical waveguide at the transition.

19. A method for manufacturing a device for laterally coupling pump light into a fiber comprising the fiber which runs in a longitudinal direction (L) and which has an optically active medium to be pumped, with a lateral wall running approximately in the longitudinal direction (L) and with at least one light coupler, at least some part of which runs parallel to the fiber along the lateral wall, wherein the light coupler is an optical waveguide which is optically coupled to the fiber such that pump light propagating in the optical waveguide can be coupled into the fiber via the lateral wall, in particular by a mode crosstalk, or by overlap of evanescent fields, wherein the fiber has two or more pump sections, each running in the longitudinal direction (L) and arranged next to one another, between which an optical waveguide is in each case arranged, such that the optical waveguides are provided in an optically transparent layer of a multi-layered wafer, wherein the device includes a coupling part with a flat contact surface for coupling pump light into the optical waveguide which lies against a flat lateral surface of the optical waveguide, said method including optical waveguides running next to one another in a plate-formed said multilayered wafer, and in which a fiber with an optically active core is then laid, in a form-locking manner, in the spaces formed between the optical waveguides, and a coupling part with a flat contact surface for coupling pump light into the optical waveguide is laid against a flat lateral surface of the at least one optical waveguide.

20. The method of claim 19, wherein the optical waveguides are created in the wafer through laser ablation, etching and/or mechanical machining processes such as milling or sawing.

21. The method of claim 19, wherein a refractive-index-matched, gel-like medium is introduced into the spaces between the optical waveguides before laying the fiber.

* * * * *